July 25, 1961 G. C. DE VORE 2,993,303
GLASS BENDING APPARATUS
Filed May 29, 1957 2 Sheets-Sheet 2
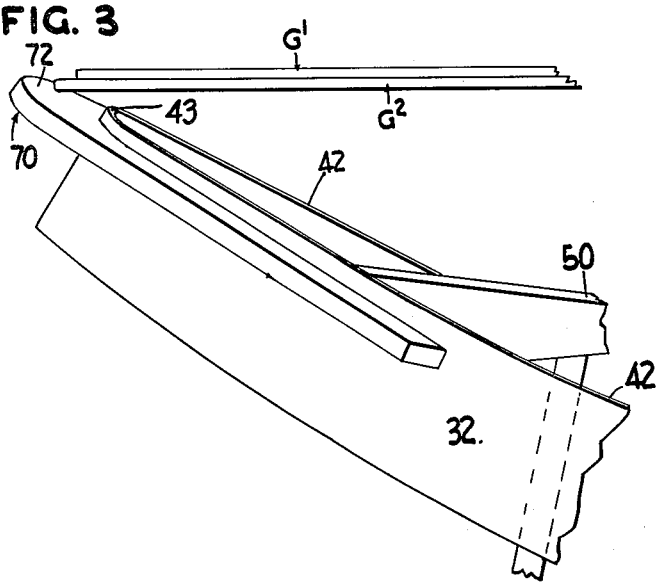
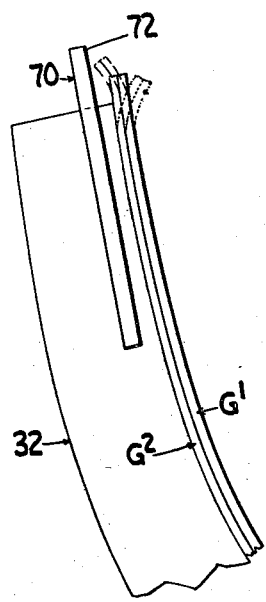
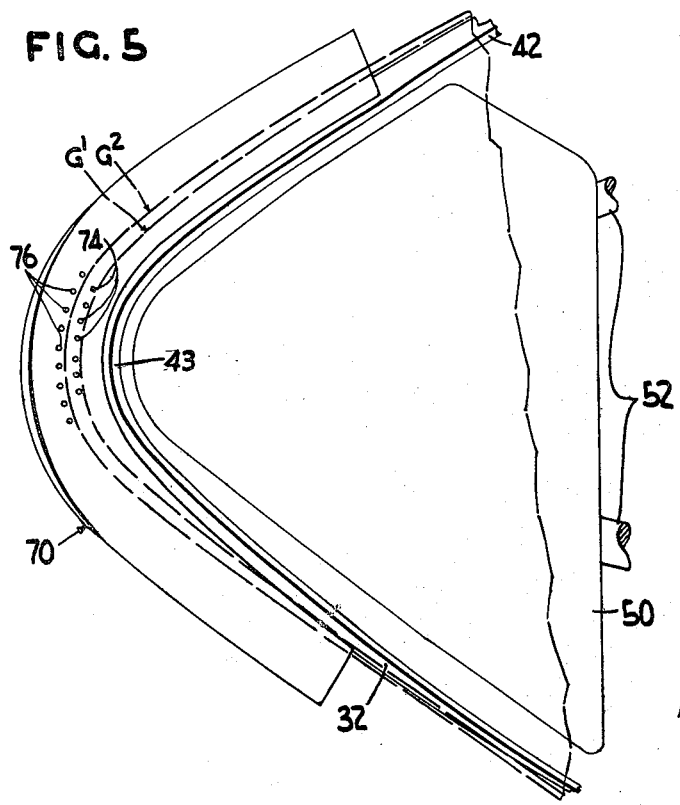
INVENTOR.
GUY C. DEVORE
BY Oscar L Spencer
ATTORNEY

United States Patent Office 2,993,303
Patented July 25, 1961

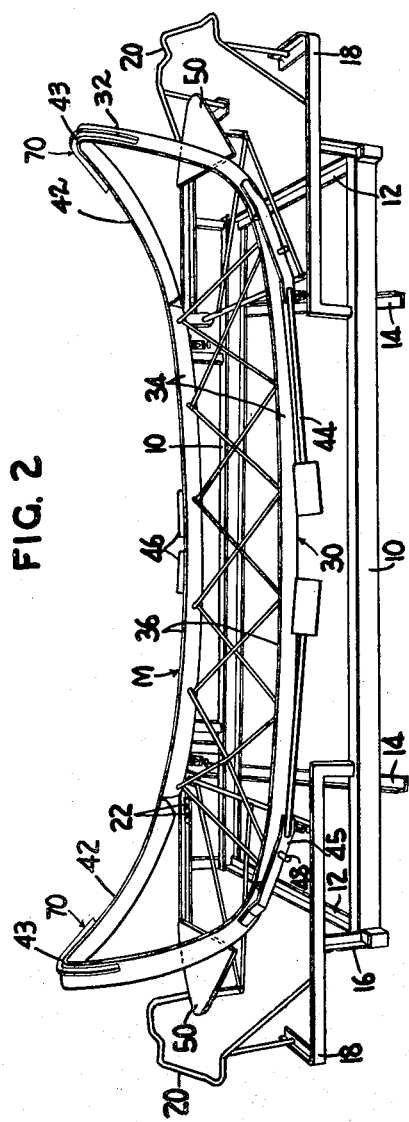

2,993,303
GLASS BENDING APPARATUS
Guy C. De Vore, Cheswick, Pa., assignor to Pittsburgh Plate Glass Company, Allegheny County, Pa., a corporation of Pennsylvania
Filed May 29, 1957, Ser. No. 662,388
4 Claims. (Cl. 49—67)

The present application relates to a glass bending apparatus. In particular, the present application relates to bending glass sheets to wrap-around shapes particularly suitable for vehicle glazing wherein the glass is bent into a curvature having a relatively gently bent central region merging into spaced, sharply, bent regions to form relatively flat longitudinal extremities extending in spaced, substantially parallel planes substantially perpendicular to the main body of the sheet.

According to present commercial practice for bending glass sheets, the glass is mounted on sectionalized bending molds and conveyed transversely through a bending lehr provided with a bending section which includes a number of heating elements heated to various elevated temperatures to impart different intensities of heat to different regions of the glass passing therethrough. In particular, for a wraparound bend, the central portion of the bending zone contains heaters that impart radiant heat at a relatively moderate intensity to the central region of the glass, and at each extremity of this moderate heat zone and in alignment with spaced, critical regions of the glass to be bent most severely are zones imparting relatively intense heat. The sheets, while heated to temptratures at or above the softening point for glass, sag to conform to the upper shaping surface of the molds which carry them through the bending lehr. The extremities of the glass sheets are passed through zones outboard of the zones intensely heated.

Considerable difficulty is encountered in bending glass sheets to shapes involving such variations in the severity of curvature. Since automobile designers require that the critical, severely bend regions of automotive windshields be adjacent the relatively flat windshield extremities, it is necessary to expose these critical regions to be bent severely to elevated temperatures. Such exposure of the critical regions causes the adjacent longitudinal extremities to be subjected to glass softening temperatures also, thereby sagging the extremities into a shape other than the flat shape desired.

Another difficulty encountered in bending glass sheets to such curvatures is the development of tension stresses at the extremities of the sheets due to the variation in temperature pattern to which different increments of the glass sheet are exposed during the bending operation. Imparting a tension stress at the extremities of the glass sheets causes the glass extremities to be susceptible to fracture. Hence, many rejects result from the improper stress patterns imparted to the glass.

The present invention inhibits overbending of the glass tips and also minimizes the establishment of tension stresses therein by connecting extension plates to each longitudinal end extremity of the bending mold below its shaping surface and extending substantially parallel to the flat end portion of the shaping surface at its longitudinal extremity. These extension plates are preferably substantially uniform in cross-section and of metal having a relatively high thermal capacity compared to the glass tips and extend outwardly beyond the mold extremities to support the extremities of one or more flat glass sheets mounted on the mold for bending.

The glass tips are in contact with a body of high thermal capacity during the early stage of the heating cycle when the temperature of the glass is being elevated from room temperature to the glass softening point. Therefore, the extension plates serve as heat absorbers during this heating phase of the bending cycle to maintain the glass tips relatively flat. As the glass sheet bends, the tips which initially have been permitted to slide along the extension out of contact with the tip of the mold shaping surface, gradually curve into conformity with the mold shaping surface, with the tips of the glass extending vertically beyond the longitudinal end extremities of the mold in spaced relation to the extension plates.

The combination of having the glass tips in continuous contact with the extension plates as the temperature is increased during the early stages of the bending cycle and continuously out of contact with the metal extension plates once the glass bending commences permits the glass tips to develop compression stresses rather than tension stresses. Furthermore, the glass tips are maintained relatively flat by virtue of the heat absorbing characteristic of the extension plates during the heating portion of the bending cycle. Therefore, the extension plates provided according to the present invention serve as means for supporting the longitudinal end extremities or tips of the flat glass sheet and for retarding the rate of heating said longitudinal end extremities during the heating portion of the bending cycle.

Indicia are provided on the extension plates to align the ends of the flat glass properly relative to the bending mold. When glass sheets are bent in pairs on molds having concave configuration and elevation, the bottom sheet of the pair is slightly longer than the top sheet in order to have their longitudinal edges coincide after bending. Each extension plate is provided with a pair of indica, the inner indicia marks for alignment with the upper sheet and the outer indicia marks for alignment with the bottom sheet of a bending doublet. Unless the glass sheets are aligned properly on the mold for complex bends, either the glass is bent improprely and fails to fit in an automotive frame, or the misaligned glass is likely to fall off the mold by dropping within the mold shaping frame during bending.

The present invention will be better understood after studying a description of a particular embodiment which is described for purposes of illustration rather than limitation. In the drawings forming part of the present disclosure, wherein like reference numerals refer to similar structural elements:

FIGURE 1 is a perspective view of a typical sectionalized skeletonized mold improved according to the present invention, with the mold shown in its open position loaded with flat glass prior to bending.

FIGURE 2 is a view of the mold similar to FIGURE 1 showing the bending mold after the bend has been completed.

FIGURE 3 is an enlarged end elevation showing a mold extremity loaded with a flat glass sheet.

FIGURE 4 is an enlarged end elevation showing the relation of the end of a glass sheet with a mold extremity after the bend has been completed.

FIGURE 5 is an enlarged plan view of a portion of the mold extremity shown in FIGURE 3.

In the drawings, a support carriage C is shown carrying a mold M for supporting a pair of glass sheets $G_1$ and $G_2$ for bending.

Carriage C comprises a pair of spaced longitudinal L beams 10 interconnected by cross beams 12 at their longitudinal extremities. A pair of rails 14 also interconnect the longitudinal beams 10 beneath the latter and intermediate cross beams 12 to provide a sliding support for moving the carriage along a roll conveyor in a bending lehr. The carriage also comprises vertical pillars 16 which support a superstructure 18 above the longitudinal L beams 10. Superstructure 18 includes a pair of opposed notched beams 19 for supporting mold support rods and handles 20 at its outboard extremities to facilitate handling and storage of the carriages.

The superstructure 18 is mounted at either longitudinal extremity of the carriage C. The opposed beams 19 of one superstructure at one end of the mold are notched at 22, whereas the opposed beams of the superstructure at the other extremity are smoothly surfaced. When the carriage C is supporting the mold M, supports rods 24 are mounted on beams 19, with one support rod interconnected between notches 22.

Molds M comprise a center molding section 30 and end molding sections 32. The center molding section comprises a pair of spaced longitudinally extending rails 34, each provided with upper shaping surfaces 36 of concave elevation conforming in elevation and outline to the contour desired for the opposed center portions of the margin of the bent glass sheet. Each rail 34 is connected at its under surface and adjacent each of its longitudinal extremities to a mold support bar 24 by means of a lug 38. Stop members 40 are also attached to the under surface of the rails 34 adjacent each lug 38. Thus, center molding section 30 is held in fixed relationship to the carriage C by the mold support bars 24 resting on the superstructure 18 of carriage C.

The end molding sections 32 are provided with upper shaping surfaces 42 of concave elevation, each terminating in a substantially flat portion at the longitudinal end extremity 43 of each end section 32. The end sections are of a modified U-shaped contour so as to provide at their shaping surfaces a configuration conforming in elevation and outline to the shape desired for the extremities of the glass sheet to be bent. Counterweighted arms 44 are attached to the longitudinally inner extremities of the end molding sections 32 through connector bars 45. Counterweights 46 are secured to the longitudinally inner extremities of the counterweighted arms 44. The end sections 32 are pivotable about hinge rods 48. The disposition of the counterweights is such as to urge the end members 32 to rotate into a closed mold position. In this position, the rails 34 of the center molding section 30 and the end sections 32 form a frame, the upper shaping surfaces 36 and 42, respectively, of which provide a substantially continuous surface conforming in elevation and outline to the shape desired for the margin of the bent glass.

The mold may also include heat abstractor plates 50 attached by means of support bars 52 to each mold support bar 24. The heat abstractor plates are designed to help maintain the mold extremities relatively stiff during the heating portion of the bending cycle.

What has just been described is a sectionalized skeletonized bending mold typical of the prior art up to the moment of the present invention. When glass is mounted on such bending molds for bending, the end sections 32 are rotated in directions opposite the moment supplied by the counterweights 46 and the flat glass sheets are supported at the longitudinal end extremities of the end sections 32 and the longitudinal extremities 56 of the rails 34. As the mold M and the carriage C are conveyed through a bending lehr, the glass softens from the applied heat and the end sections 32 are rotated by the counterweights 46. As the end members 32 rotate, they force the extremities of the glass sheets upwardly.

If the tips of the flat glass sheets extend substantially beyond the mold extremities, they become reversely curved during bending. In other words, the tips sag in a direction opposite that desired for the main bending curve for the glass sheet. On the other hand, if the tips of the glass sheet rest exactly on the longitudinal end extremities of the end sections 32, tension stresses are established at the tips during the cooling phase of the bending and annealing cycle. If the glass sheets are shorter after bending than the mold frame or misaligned on the frame before bending, the glass is likely to fall in within the shaping frame and a valuable piece of glass is lost. Furthermore, prior art molds did not make provision to insure proper alignment of the glass sheets on the open mold before bending.

According to the present invention, an extension plate 70, having a flat upper surface located only in a plane substantially parallel to the plane occupied by each flat end portion of the shaping surface, is attached at the extremity of the end molding section 32 to encompass each tip of the mold M below its shaping surface. As shown in FIGURE 5, the extension plates are apertured to provide an inboard set of holes 74 conforming to the outline of the upper sheet of a bending doublet and are also apertured at 76 to provide a guide conforming to the outline of the bottom sheet of a bending doublet. While the series of apertures have been disclosed, it is understood that any suitable indicia marks may be utilized for aligning the tips of the glass sheets properly. The extension plates are preferably of a heat-resistant metal such as 18–8 stainless steel (18% Ni, 8% Cr and balance Fe) 1 inch wide and ¼ inch thick.

When molds, according to the present invention, are employed properly, they are spread into the open mold position for flat glass sheets $G_1$ and $G_2$ to rest on the longitudinal extremities 56 of the center section mold rails 34 and at their longitudinal extremities on the outward extremity portion of each of the extension plates 70. The flat glass is entirely out of contact with the end sections 32 of the bending mold, because the outward extremity portions of the extension plates 70, which support the flat glass sheet extremities, lie entirely above the shaping surfaces 42 of end sections 32 as seen in FIGS. 3 and 4. The flat upper surface 72 of each extension plate or heat absorber member 70 which lies only in a plane parallel to that occupied by the longitudinal extremity 43 of the mold shaping surface to which it is attached is the only member that contacts a longitudinal end extremity of the flat glass sheet when the end section 32 to which it is attached is rotated into a spread position for supporting a flat glass sheet.

As the glass laden mold is moved through a bending lehr and the temperature of the glass is raised to the softening point, the end sections are rotated to lift the extremities of the glass sheet outboard of the intermediate support points on the extremities 56 of the center section rails 34. The glass sheet becomes softened by the application of heat and begins to sag so that its central portion conforms to the upper shaping surfaces 36 of the center section rails 34. Meanwhile, the heat softened glass sheet extremity portions initially slide downwardly on the substantially flat upper shaping surfaces 72 of the extension plates 70 until they contact the tip of the upper shaping surface 42 of the end sections 32 with the tips of the glass sheet $G_2$ extending beyond the tip of the end section surface 42. The tips of the glass sheets, having been kept relatively rigid by virtue of their contact with the extension plate 70 during the heating phase of the bending cycle, resist reverse flexture shown in the dashed lines of FIGURE 4. Also, their stiffness inhibits overbending of the tips such as shown in the dotted lines of FIGURE 4. As the glass continues to soften, the end sections 32 rotate upwardly to impress their upper shaping surfaces 42 onto the glass sheet extremity portions.

During the end of the heating cycle and throughout the annealing, the tips of the glass sheet are maintained in spaced relation to the extension plates 70. Maintaining the glass tips continuously out of contact with the metal extension plates and the tips of the end sections 32 during the cooling phase of the bending cycle when the glass is annealed after bending permits the glass tips to develop a compression stress.

By virtue of the present invention, the indicia markings 74 and 76 insure that flat glass sheets are aligned properly on the bending mold and are bent properly to complex curvatures. The use of extension plates ¼ inch thick and 1 inch wide attached to each extremity of the end section on the order of ¼ inch below the shaping surface provides a body of sufficiently high thermal capacity relative to the tips of the glass to abstract sufficient heat from the glass tips to maintain them relatively rigid during the heating phase of the bending and annealing cycle, while the separation of the tips of the glass from the metal plate and the shaping surface during the cooling phase of the annealing cycle permits the tips to be cooled sufficiently rapidly to develop a compression stress at the glass tips. Thus, glass tip breakage due to improper stresses is avoided.

What is claimed is:

1. Apparatus for bending flat elongated glass sheets in a lehr where the glass temperature is raised to the glass softening point and subsequently reduced, said apparatus comprising a horizontally disposed, sectionalized bending mold comprising two pivotally connected end mold sections, each having an upper concave shaping surface including a longitudinal end extremity, said end mold sections being pivotable into a lowered, open mold position for receiving flat glass sheets preparatory to bending and into a raised, closed mold position, and only means for supporting each longitudinal end extremity of the flat glass sheet in the open mold position and for retarding the rate of heating said supported end extremity attached to each said longitudinal end extremity of said end mold section, said means consisting of a heat absorber member of substantially uniform cross-section connected to the longitudinal end extremity of each end mold section below its shaping surface, each said member having an upper surface which lies only in a plane substantially parallel to and spaced below said upper shaping surface, and which upper surface of said member extends longitudinally outwardly from the longitudinal end extremity of said end mold section only in said plane, said surface of said member having an outward extremity portion located above the longitudinal end extremity of said upper shaping surface of its attached end mold section in the lowered, open mold position to contact the bottom surface only of the longitudinal extremities of the flat glass sheet out of contact with the longitudinal end extremities of the end mold sections, whereby, upon movement of the end mold sections into the raised, closed mold position in response to the heat softening and bending of the flat glass sheet, the longitudinal end extremities of the end mold sections support the longitudinal extremities of the bent glass in spaced relation to said upper surface of said heat absorber member.

2. Apparatus as in claim 1, wherein said member is marked at its upper surface with indicia for aligning a longitudinal extremity of an unbent glass sheet thereon.

3. Apparatus as in claim 1 for bending superimposed glass sheets in pairs, wherein said member is marked at its upper surface with inner and outer indicia for aligning an extremity of the upper and lower unbent glass sheets, respectively.

4. Apparatus as in claim 1, wherein the mold comprises a center molding section comprising a pair of laterally spaced, longitudinally extending rails of concave elevation having longitudinal extremities, said center molding section interconnecting two of said end mold sections, means for pivotally interconnecting said center molding section and each end mold section adjacent thereto, said longitudinal extremities of said longitudinally extending rails all lying in a common horizontal plane that lies completely above the concave shaping surface of each said end mold section and intersects the upper surface of each said heat absorber member when said end mold sections are pivoted into said lowered, open mold position.

References Cited in the file of this patent

UNITED STATES PATENTS

| | | |
|---|---|---|
| 2,452,488 | Paddock et al. | Oct. 26, 1948 |
| 2,608,030 | Jendrisak | Aug. 26, 1952 |
| 2,758,422 | Jendrisak | Aug. 14, 1956 |
| 2,774,189 | Jendrisak | Dec. 18, 1956 |
| 2,827,738 | McKelvey | Mar. 25, 1958 |
| 2,869,287 | Bamford | Jan. 20, 1959 |

FOREIGN PATENTS

| | | |
|---|---|---|
| 203,334 | Australia | Sept. 21, 1956 |
| 1,089,973 | France | Oct. 13, 1954 |